United States Patent [19]

Saito

[11] Patent Number: 5,713,031
[45] Date of Patent: Jan. 27, 1998

[54] HYPERMEDIA DATABASE SYSTEM

[75] Inventor: Shinya Saito, Kawasaki, Japan

[73] Assignee: Fuji Xerox Co., Ltd., Japan

[21] Appl. No.: 622,256

[22] Filed: Mar. 26, 1996

Related U.S. Application Data

[63] Continuation of Ser. No. 279,269, Jul. 22, 1994, abandoned, which is a continuation of Ser. No. 724,704, Jul. 2, 1991, abandoned.

[30] Foreign Application Priority Data

Jul. 5, 1990 [JP] Japan ............... 2-178051

[51] Int. Cl.$^6$ ............................................. G06F 17/30
[52] U.S. Cl. ........................... 395/762; 395/614; 395/788
[58] Field of Search ........................ 395/145, 148, 395/154, 155, 157, 160, 161, 614, 762, 776–778, 788

[56] References Cited

U.S. PATENT DOCUMENTS

| | | | |
|---|---|---|---|
| 4,609,918 | 9/1986 | Nakanishi et al. | 395/140 |
| 4,714,918 | 12/1987 | Barker et al. | 345/118 |
| 4,800,510 | 1/1989 | Vinderg et al. | 395/140 |
| 4,809,189 | 2/1989 | Batson | 395/140 |
| 4,847,785 | 7/1989 | Stephens | 395/140 |
| 4,975,690 | 12/1990 | Torres | 345/119 |
| 5,081,592 | 1/1992 | Jenq | 364/487 |
| 5,088,052 | 2/1992 | Spielman et al. | 395/158 |
| 5,212,770 | 5/1993 | Smith et al. | 395/155 |

OTHER PUBLICATIONS

Deux et al., "The Story of O2", IEEE Transactions on Knowledge and Data Engineering, v. 2, n. 1, pp. 91–108, Mar. 1990.

Heiler et al., "Views, Data Abstraction, and Inheritance in the FUGUE Data Model", Proceedings of 2nd Int'l Workshop on Object–Oriented Database Systems, pp. 225–241, Sep. 1988.

Coutaz, "The Construction of User Interfaces and the Object Paradigm", Proceedings of ECOOP '87, pp. 135–144, Jun. 1987.

Shilling et al., "Three Steps to Views: Extending the Object–Oriented Paradigm", OOPSLA '89 Proceedings, pp. 353–361, Oct. 1989.

Adaptability and Tailorability in Note Cards, Trigg, R.H. Moran, T.P. Halasz, F., Proceedings of Interact '87 2nd IFIP Conference on Human–Computer Interaction, pp. 723–728, Jan. 1987.

"Interactively Editing Structured Documents", Furuta, R., Quint, V., Andre, J., Electronic Publishing, vol. 1, No. 1, Apr. 1988, pp. 19–44 and its erratum.

*Primary Examiner*—Joseph R. Burwell
*Attorney, Agent, or Firm*—Welsh & Katz, Ltd.

[57] ABSTRACT

An extendable hypermedia system has a hypermedia data base for storing a hypermedia data, a data processor for executing modification of the data stored in the hypermedia data base and also for executing addition of the type of the associated data, a view processor for executing modification of a view corresponding to the data processed by the data processor and also for executing addition of the type of the associated view, a display for providing a data display, and a window system for executing display of the data corresponding to the view processed by the view processor on the display and also for informing the view processor of a data entered on the display. In the hypermedia system a programmer can arbitrarily add both data type and view type.

8 Claims, 11 Drawing Sheets

HYPERMEDIA DATABASE SYSTEM

This is a continuation of patent application Ser. No. 08/279,269, filed Jul. 22, 1994, now abandoned, which is a continuation of Ser. No. 07/724,704, filed Jul. 2, 1991, now abandoned.

BACKGROUND OF THE INVENTION

1. Field of the Invention

The present invention relates to a hypermedia system and more particularly, to a hypermedia system wherein a programmer can arbitrarily add or delete both data type and view type.

2. Description of the Related Art

A hypermedia system is a data processing unit capable of linking the information on data such as document, picture, image, sound and so on. Attention has been recently focused on the hypermedia system because it enables development and utilization of the applications suitable for data collection, retrieval, management, presentation and so on.

In a conventional hypermedia system, a programmer can arbitrarily add a type of hypermedia data such as figure, character and table.

However, in the conventional system, a data and a view as its display image are in a one-to-one relation. Accordingly, when it is desired to change display of a picture image in one view from another view, a new data corresponding to the new view must be created in a memory. For example, when it is desired to display a data indicative of table in the form of a view corresponding to table and also to display the data in a view corresponding to bar graph, in a view corresponding to line graph and in a view corresponding to a pie graph, it is necessary to create data corresponding to the bar graph view, data corresponding to the line graph view and data corresponding to the pie graph view in the memory, respectively.

With this conventional system, however, it is necessary to create in the memory a number of data having the same content, each corresponding to the types of the views. This is disadvantageous from the viewpoint of effective use of the memory resource. Further, since each view corresponds to its associated data in one-to-one relation, it is impossible to reflect data entered for one view on another view.

For the purpose of avoiding the above disadvantageous, there has been proposed a system in which a single data corresponds to plural types of views. In this system, a programmer can arbitrarily add a new type of the views and a data entered as associated with one view can also reflect on another view.

However, although this system allows the addition of the new view by the programmer, it is impossible to add new data.

As discussed above, one conventional hypermedia system has problems that, when it is desired to display data in the form of a plurality of views, it is necessary to create in the memory a number of data corresponding to the types of the views, which is undesirable from the viewpoint of effective use of the memory resource, and further that data entered for one view cannot reflect on another view.

Further, although another conventional system in which plural types of views correspond to a single data is advantageous in that a programmer can add a new type of view, the programmer cannot add a new type of data.

SUMMARY OF THE INVENTION

It is therefore an object of the present invention to provide an extendable hypermedia system in which a programmer can arbitrarily add both data type and view type.

In accordance with one aspect of the present invention, the above object is attained by a hypermedia system which comprises a data processor for processing a data stored in a hypermedia data base and also allowing addition of the type of the data and a view processor for controlling a view corresponding to the data processed by the data processor and also allowing addition of the type of the view, whereby a programmer can arbitrarily add both the data type and the view data.

In the present invention, the processing of the data processor enables the programmer to add arbitrarily the data type, while the processing of the view processor enables the programmer to add arbitrarily the view type.

As described above, in accordance with the present invention, since the programmer can arbitrarily add the data type and the view type, its system extendability can be made very high. Further, since the system can prepare a plurality of types of views, it can provide a plurality of representation methods for a single data. In addition, since the data are separated from the views, a single data can be expressed in the form of a plurality of views.

DESCRIPTION OF THE PREFERRED EMBODIMENTS

Figure 1:
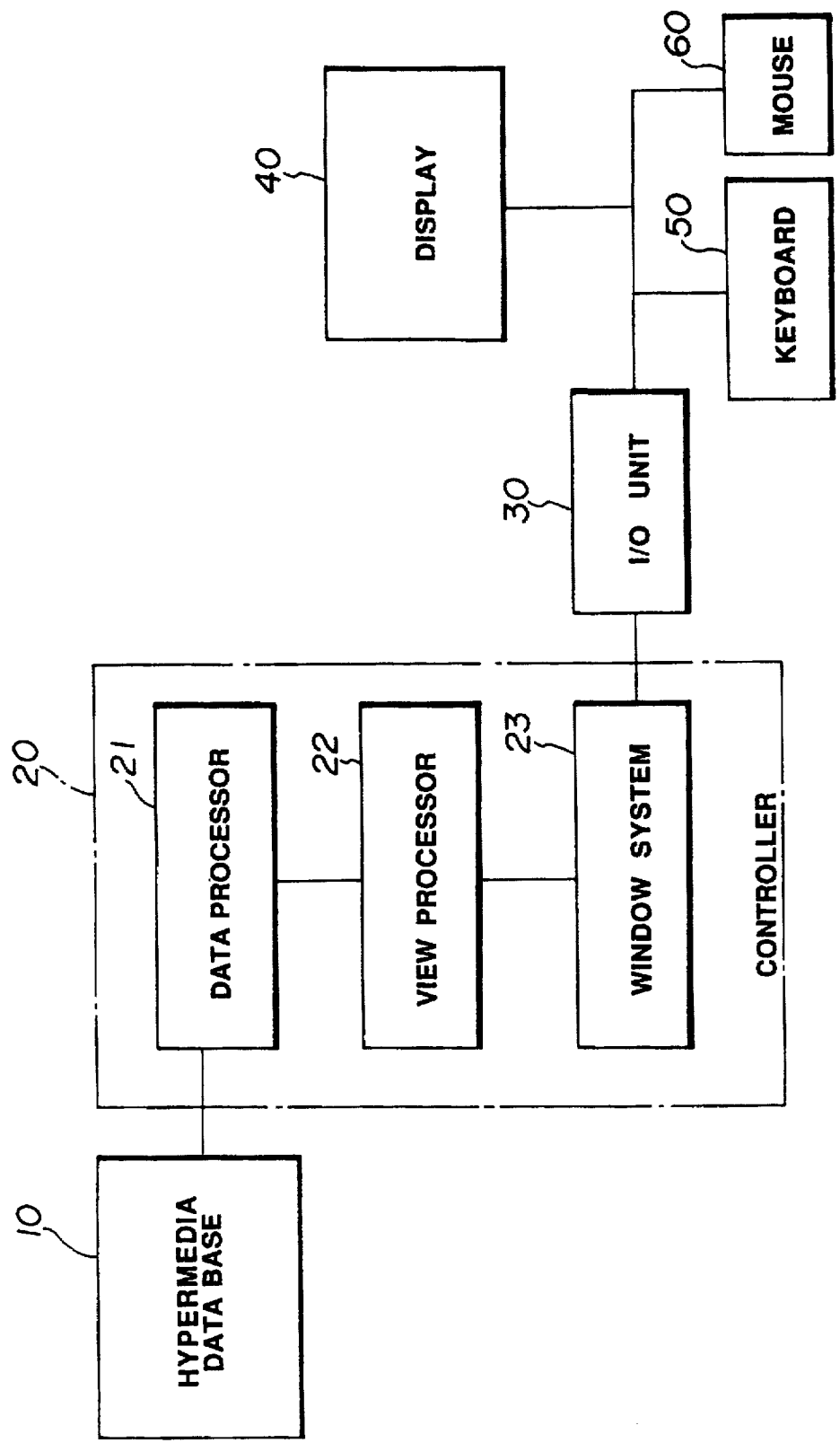
FIG. 1 is a block diagram showing a schematic arrangement of a hypermedia system to which an embodiment of the present invention is applied.

FIG. 1 shows a block diagram of a hypermedia system in accordance with an embodiment of the present invention, which includes a hypermedia data base 10 for storing hypermedia data, a controller 20 for performing processing of the data stored in the hypermedia data base 10 and also display processing of the data, an input/output (I/O) unit 30, a display unit 40 connected through the input/output unit 30 to the controller 20 for displaying a view processed at a view processor of the controller 20, a keyboard 50 through which a user enters information and commands, and a mouse 60.

The controller 20 comprises a data processor 21 for executing the processing of the data stored in the hypermedia data base 10, a view processor 22 for executing the processing of a view to be indicated on the display 40, and a window system 23 for executing the control of the view indicated on the display 40.

The data processor 21 of the controller 20 executes processings (1) to (4) as follows.

(1) In response to a data read request received from the view processor 22, the data processor 21 reads necessary data from the hypermedia data base 10 and sends the read data to the view processor 22.

(2) In response to a data modification request received from the view processor 22, the data processor 21 modifies the corresponding data stored in the hypermedia data base 10.

(3) When the data processor 21 modifies a data in the hypermedia data base 10 while keeping a relationship between the data and view, the data processor 21 informs the view processor 22 of a view re-display request.

(4) When informed of a view opening or closing from the view processor 22, the data processor 21 modifies the relationship between the data and view.

The view processor 22 of the controller 20 executes processings (1) to (4) as follows.

(1) When informed of a user input of a view from the window system 23, the view processor 22 informs the data processor 21 of a data modification request corresponding to the user input.

(2) When informed of a view re-display request from the window system 23, the view processor 22 informs the data processor 21 of a data read request. When the view processor 22 receives the corresponding data from the data processor 21 in response to this, the view processor 22 generates a view corresponding to the received data.

(3) When informed of a view re-display request from the data processor 21, the view processor 22 informs the data processor 21 of a data read request. In response to this, when the view processor 22 receives the corresponding data from the data processor 21, the view processor generates a view corresponding to the received data.

(4) When receiving a notification from the window system 23 that the window of the display 40 is opened or closed, i.e., a view opening or closing operation, the view processor 22 informs the data processor 21 of the opened or closed view information.

Further, the window system 23 executes display control of a window to be indicated on the display 40 through the input/output unit 30, and also when the user gives a user input onto the window through the intervention of the keyboard 50 or mouse 60, detects the user input and informs the view processor 22 of the effect.

Figure 2:
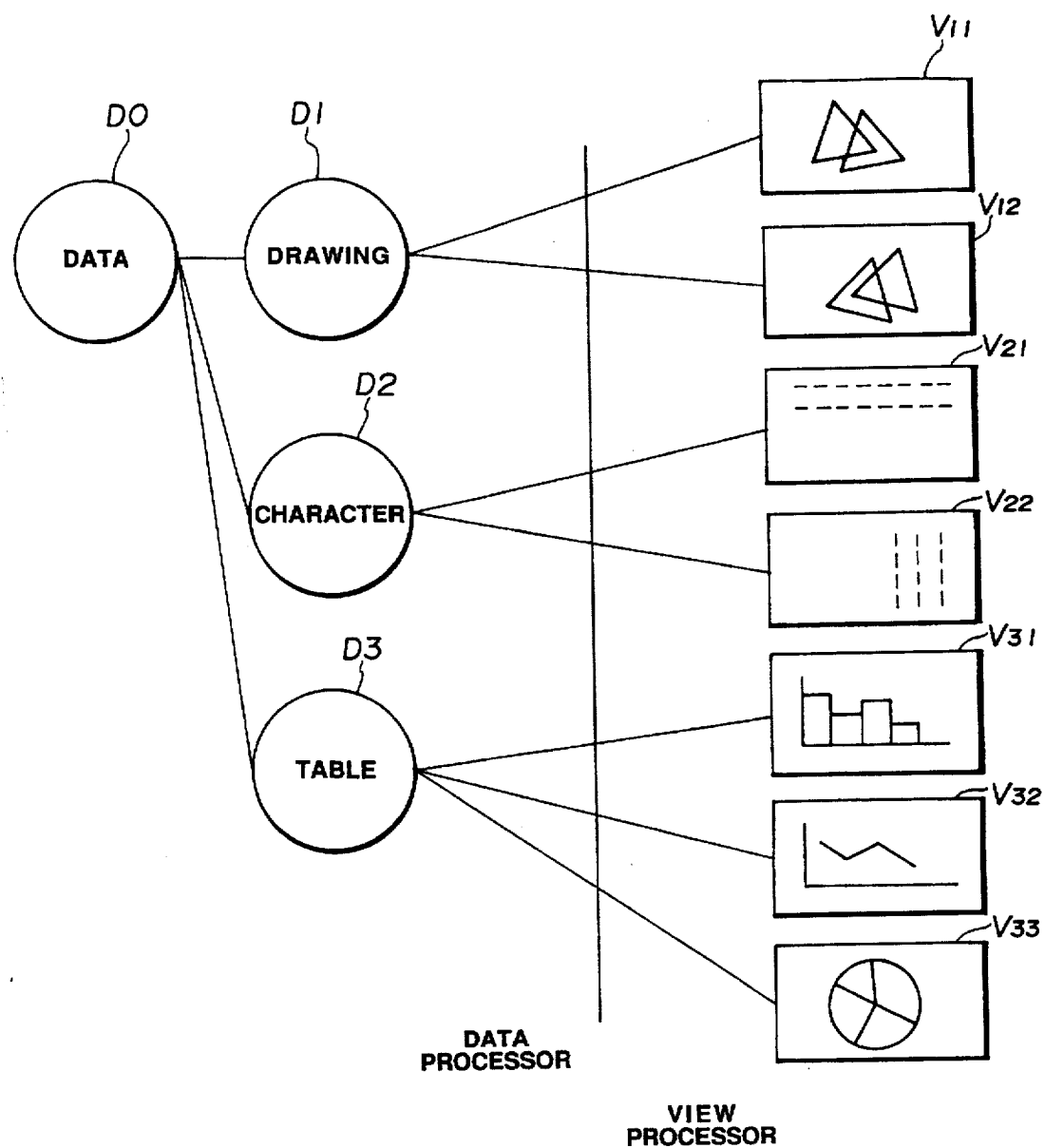
FIG. 2 is a diagram for explaining relationships between data and views in the present embodiment.

In the present embodiment, programmer's operation enables the data processor 21 to arbitrarily add a desired data type and also enables the view processor 22 to arbitrarily add a desired view type. Referring to FIG. 2, a data D0 is a data first previously stored in the hypermedia data base 10, while data D1, D2 and D3 are data of types which are added by the data processor 21 based on the data D0 and different from the data D0. More specifically, for example, the data D1 is of a figure type, the data D2 is of a character type, and the data D3 is of a table type.

Further, views V11 to V33 as examples are generated by the view processor 22. In more detail, in the present embodiment, the views V11 and V12 correspond to the data D1, the views V21 and V22 to the data D2, and the views V31, V32 and V33 to the data D3.

In other words, the data D1 is expressed in the form of the two views V11 and V12 and in this embodiment, the view V12 is in an inverted relationship with the view V11.

The data D2 is expressed in the form of the two views V21 and V22 and in this embodiment, the view V21 is of a horizontal writing type while the view V22 is of a vertical writing type. The data D3 is expressed in the form of the three views V31, V32 and V33 and in this embodiment, the view V31 is of a bar graph and the view V33 is of a pie chart.

In this way, the present embodiment is arranged so that the data processor 21 enables the addition of a plurality of types of data and the view processor 22 enables the correspondence of a plurality of types of views to the plurality of types of data added by the data processor 21 respectively.

Figure 3:
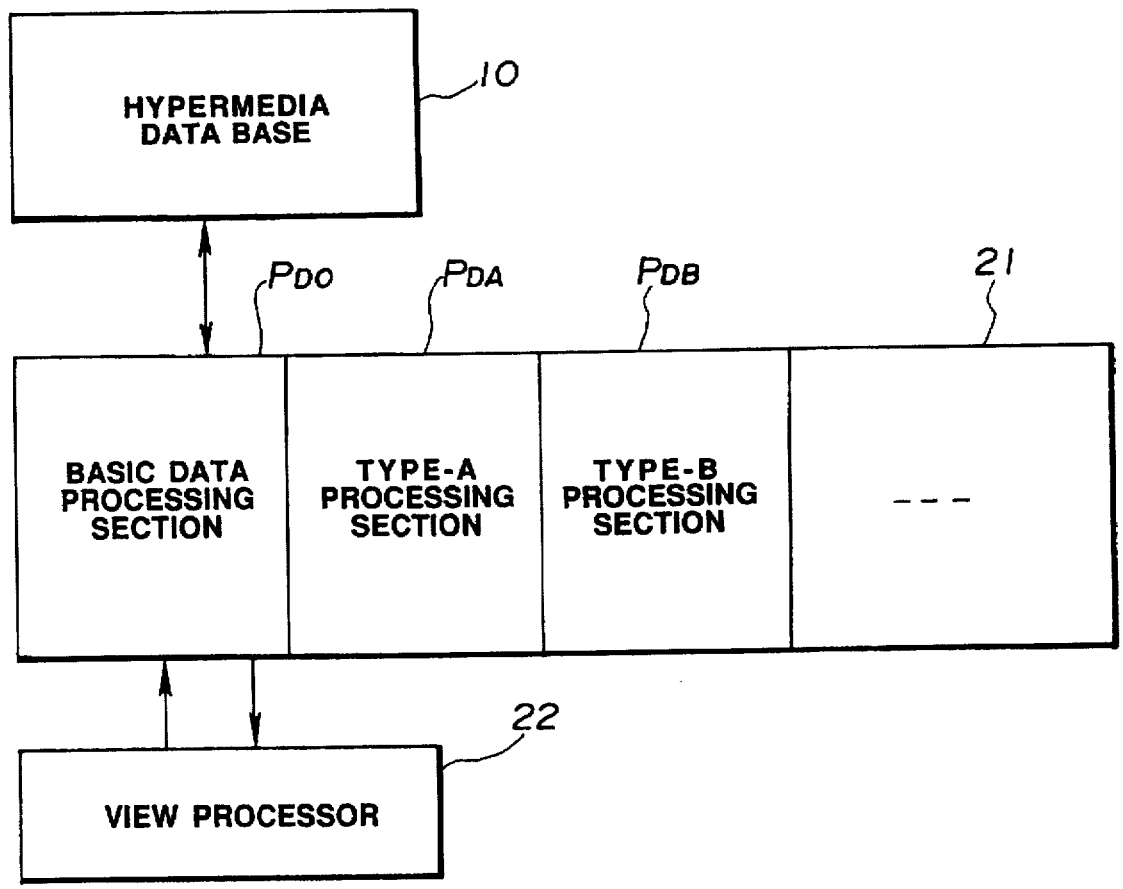
FIG. 3 is a block diagram showing a detailed arrangement of a data processor.

Shown in FIG. 3 is a detail of the data processor 21 which comprises a basic data processing section $P_{DO}$ for performing basic processing of data, a type A processing section $P_{DA}$ for performing processing of a type A of data, a type B processing section $P_{DB}$ for performing processing of a type B of data . . . .

Figure 5:
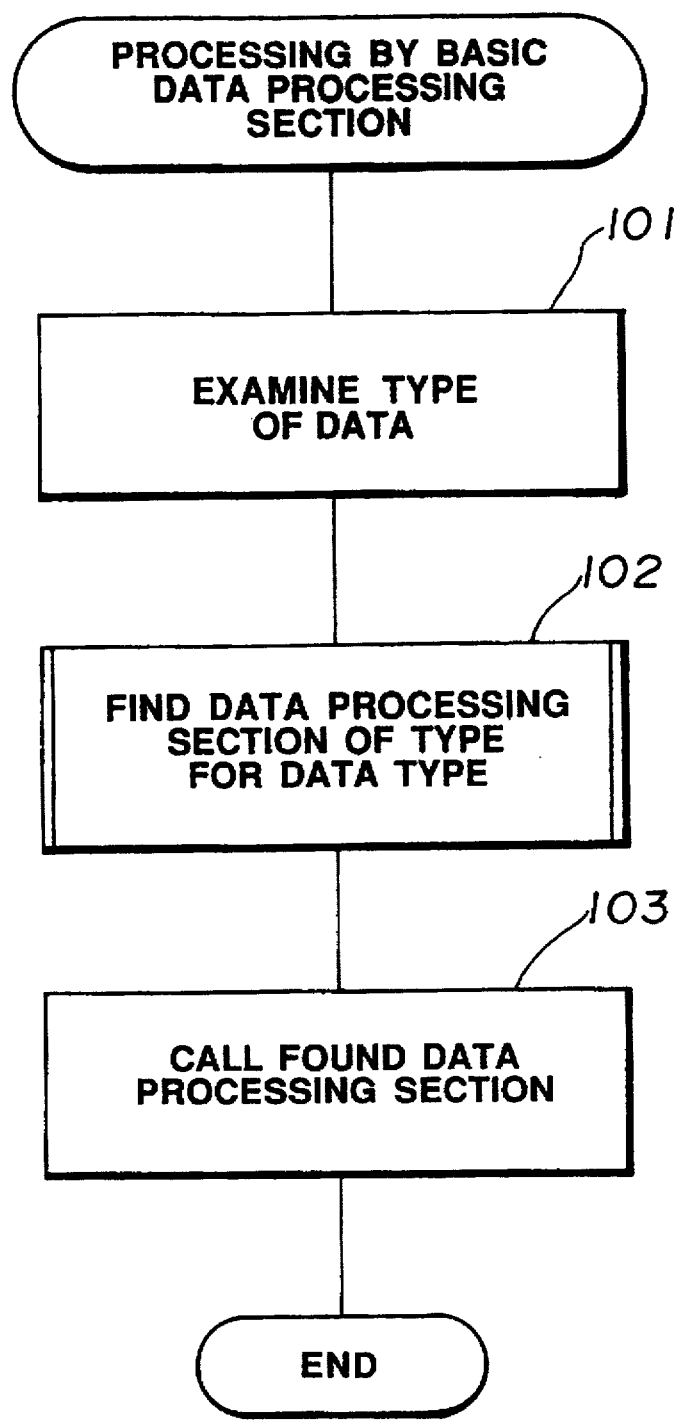
FIG. 5 is a flowchart for explaining the processing operation of a basic data processing section.

The basic data processing section $P_{DO}$, which is connected to the hypermedia data base 10 and the view processor 22, carries out processing shown by a flowchart in FIG. 5. More specifically, the basic data processing section $P_{DO}$, when accessed by the hypermedia data base 10 or view processor 22, first examines the type of the accessed data (step 101) and finds one of the data processing sections corresponding to the data type (step 102). This procedure is carried out like this. That is, a programmer previously stores in the basic data processing section $P_{DO}$ such a table showing a relationship between data types and corresponding procedure pointers as given in Table 1. The above procedure is carried out by retrieving this table to find the corresponding data processing section.

TABLE 1

| Data Type | Procedure Pointer |
|---|---|
| A | . . . |
| B | . . . |
| . | . |
| . | . |
| . | . |

The basic data processing section, when finding the data processing section corresponding to the data type, calls the found data processing section (step 103). Thereafter, the processing of the called data processing section is executed.

The data processor 21 has such a data/view table showing a relationship between data and corresponding views as given in Table 2.

TABLE 2

| View No. | Data Name |
|---|---|
| 1 | D1 |
| 2 | D2 |
| 3 | D3 |
| . | . |
| . | . |

In Table 2, the view number corresponds to the number of a window being displayed on the display 40, while the data name corresponds to the name of the data being stored in the hypermedia data base 10. In the present embodiment, any view numbers and data names are not overlapped to each other.

Figure 4:
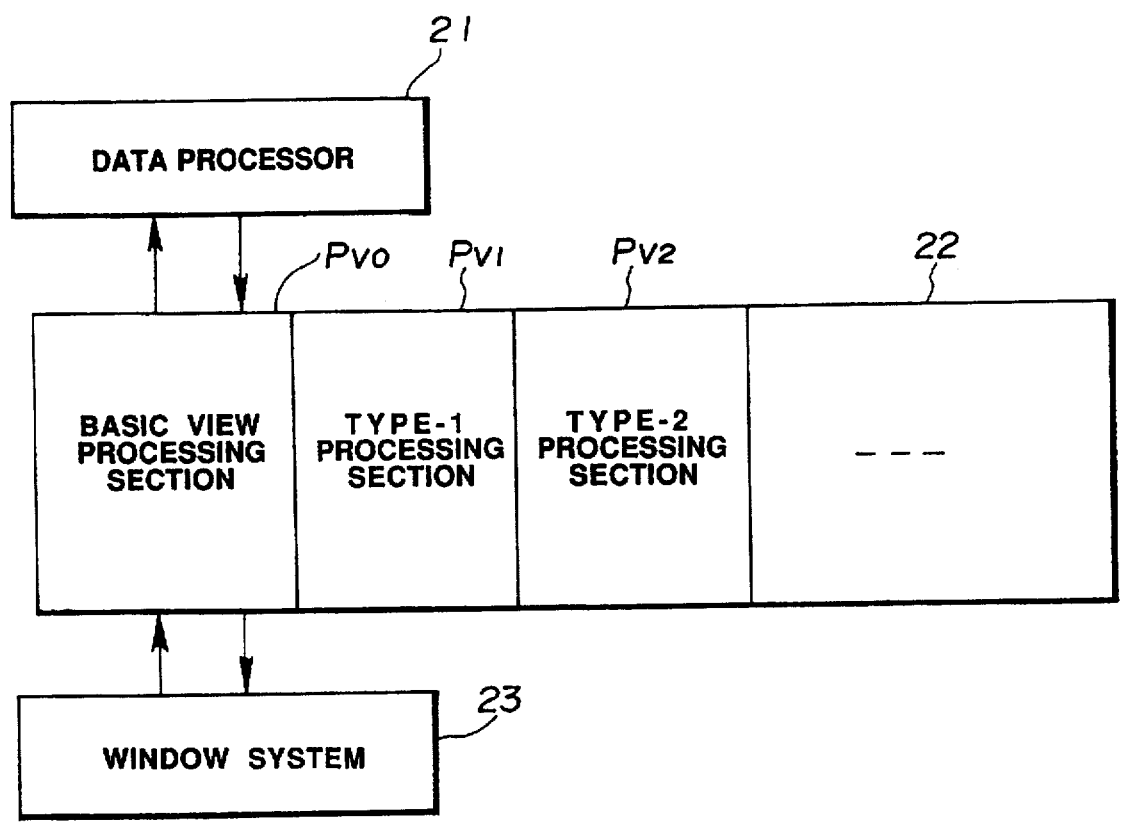
FIG. 4 is a block diagram showing a detailed arrangement of a view processor.

FIG. 4 shows a detail of the view processor 22 which comprises a basic view processing section $P_{VO}$ for performing basic processing of views, a type-1 view processing section $P_{V1}$ for performing processing of a type 1 of view, a type-2 view processing section $P_{V2}$ for performing processing of a type 2 of view, . . . .

Figure 6:
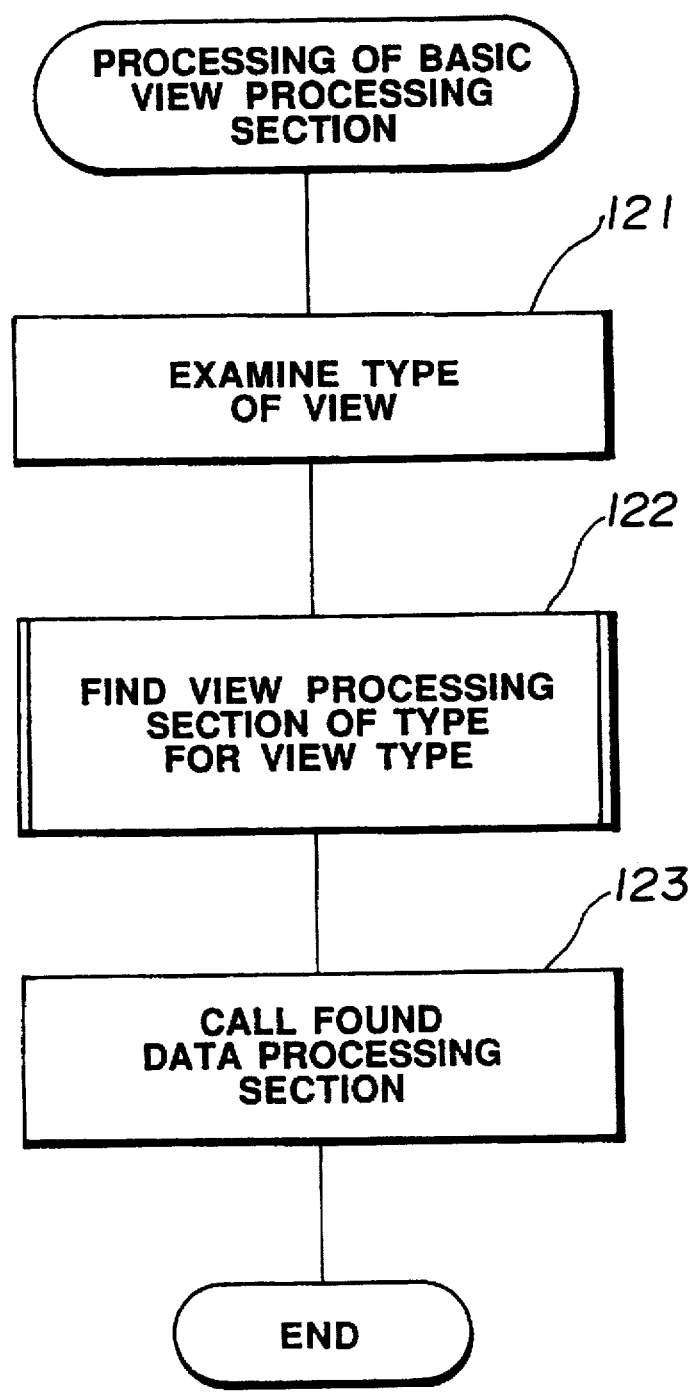
FIG. 6 is a flowchart for explaining the processing operation of a basic view processing section.

The basic view processing section $P_{DO}$, which is connected to the data processor 21 and the window system 23, carries out such processing as shown by a flowchart in FIG. 6. More specifically, the basic view processing section $P_{VO}$, when accessed by the data processor 21 or window system 23, first examines the type of the accessed view (step 121) and finds one of the view processing sections corresponding to the view type (step 122). This procedure is carried out like this. That is, a programmer previously stores in the basic view processing section $P_{VO}$ such a table showing a relationship between view types and corresponding procedure pointers as given in Table 3.

The above procedure is carried out by retrieving this table to find the corresponding view processing section.

TABLE 3

| View Type | Procedure Pointer |
|---|---|
| A | . . . |
| B | . . . |
| . | . |
| . | . |
| . | . |

The basic view processing section, when finding the view processing section corresponding to the view type, calls the found view processing section (step 123). Thereafter, the processing of the called view processing section is executed.

The processings of the data and view processors 21 and 22 will be further detailed by referring to flowcharts of FIGS. 7 to 11.

Figure 7:
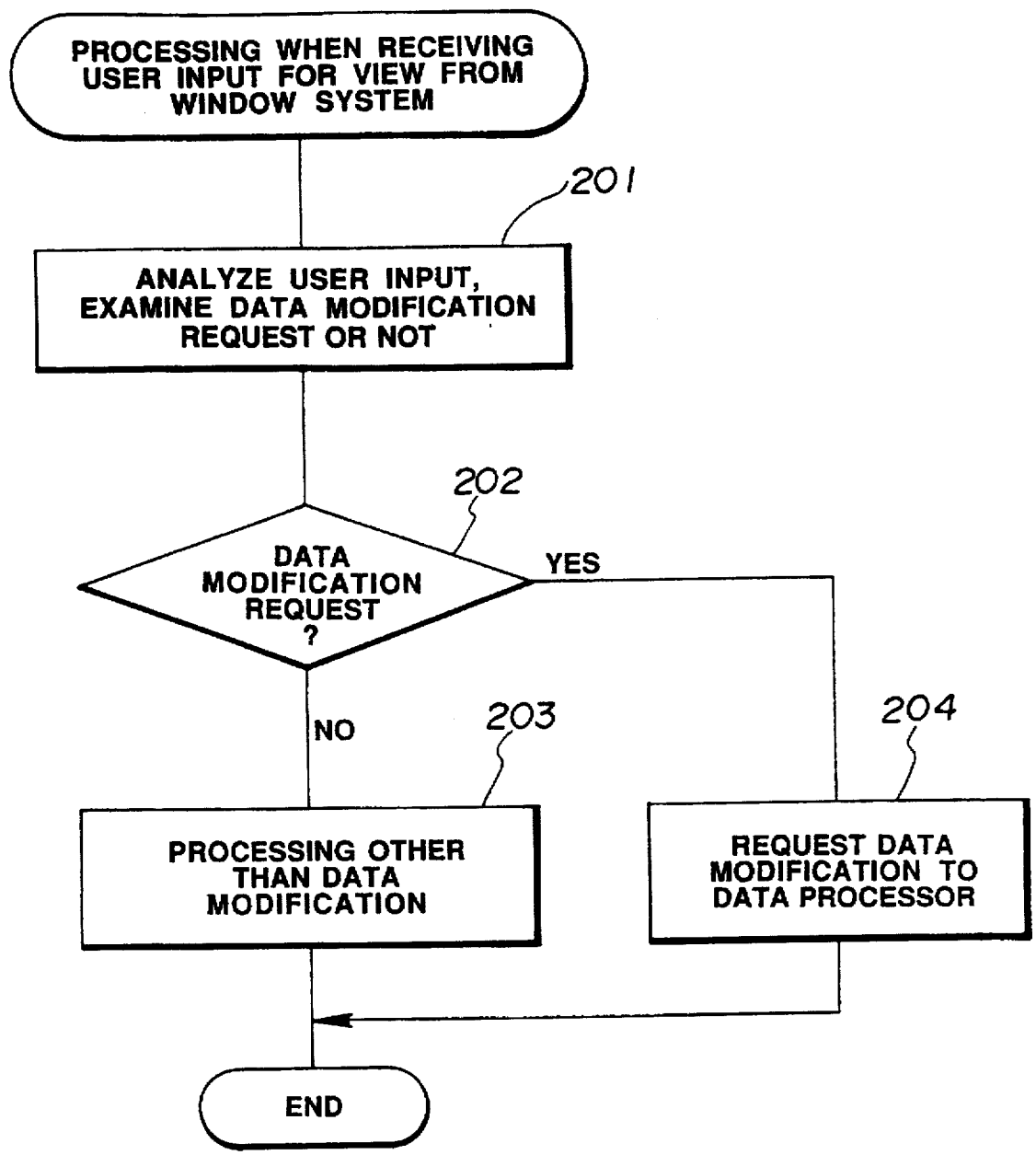
FIG. 7 is a flowchart for explaining the processing operation of the view processor when receiving a user input of a view from a window system.

FIG. 7 shows the processing of the view processor 22 when receiving a user input of a view from the window system 23. In this case, the view processor 22 analyzes the user input and examines whether or not the user input indicates a data modification input (step 201). When determining that the user input indicates the data modification input (step 202), the view processor 22 informs the data processor 21 of a data modification request (step 204). When determining that the user input does not indicate the data modification input, the view processor 22 executes the processing corresponding to the user input except for the data modification, for example, data selection or scrolling processing (step 203).

Figure 8:
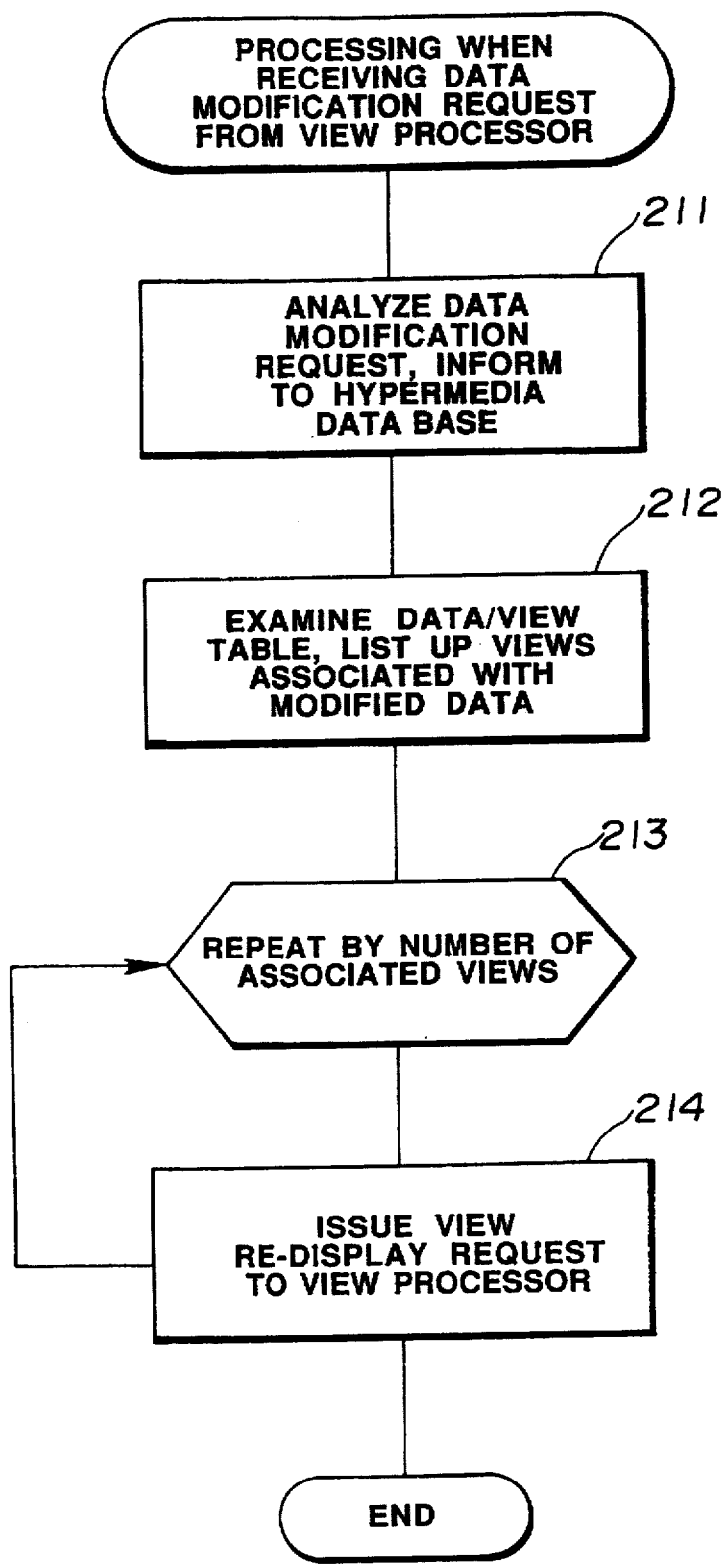
FIG. 8 is a flowchart for explaining the processing operation of the data processor when informed of a data modification request from the view processor.

FIG. 8 shows the processing of the data processor 21 when informed of the data modification request from the view processor 22. In this case, the data processor 21 first analyzes the informed data modification request and informs the hypermedia data base 10 of its analysis result (step 211). This results in that the data of the hypermedia data base 10 is modified.

Subsequently, the data processor 21 retrieves such a data/view table as shown in Table 2 to list views associated with the modified data (step 212). Thereafter, the data processor 21 informs the view processor 22 of a re-display request to all the views associated with the modified data (steps 213 and 214).

Figure 9:
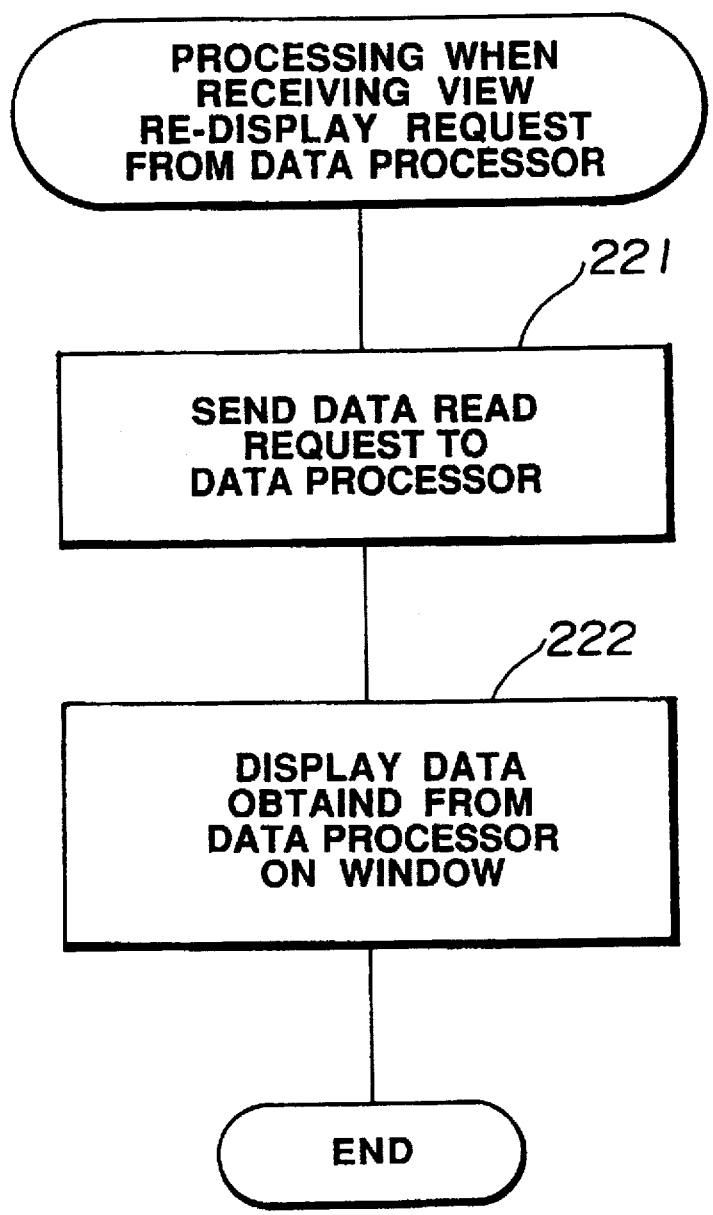
FIG. 9 is a flowchart for explaining the processing operation of the view processor when receiving a view redisplay request from the data processor.
Figure 10:
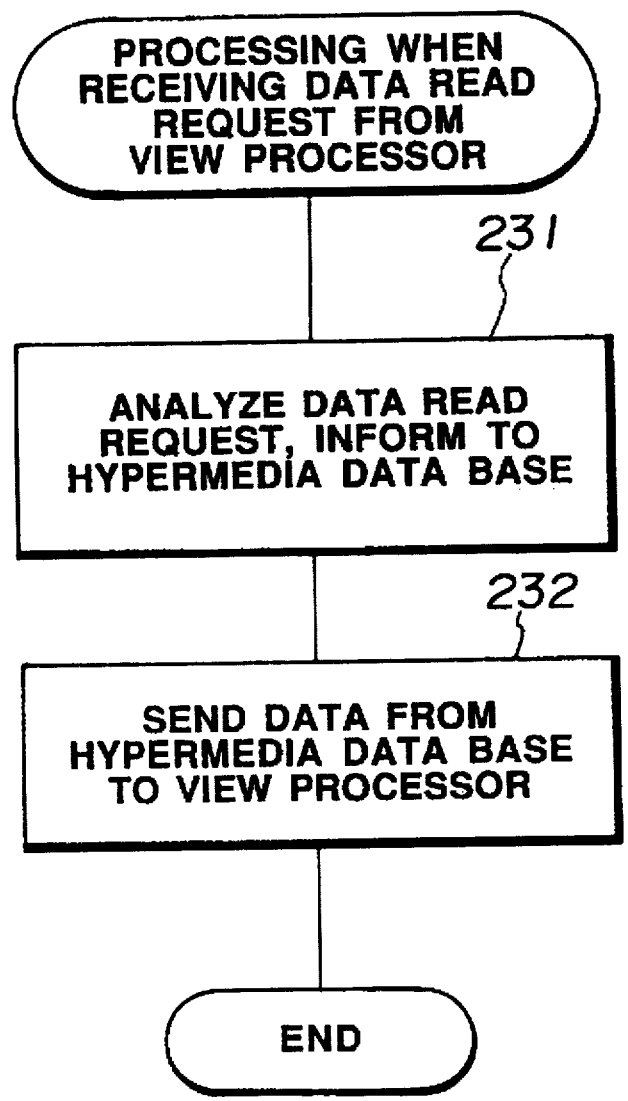
FIG. 10 is a flowchart for explaining the processing operation of the data processor when receiving a data read request from the view processor.

FIG. 9 shows the processing of the view processor 22 when receiving the view re-display request from the data processor 21, while FIG. 10 shows the processing of the data processor 21 when receiving a data read request from the view processor 22. The view processor 22, when receiving the view re-display request from the data processor 21, informs the data processor 21 of the data read request (step 221).

The data processor 21, when receiving the data read request from the view processor 22, analyzes the received data read request and informs the hypermedia data base 10 of its analysis result (step 231). The data processor 21, when receiving a data to be read from the hypermedia data base 10 in response to this, reads it and sends it to the view processor 22 (step 232).

The view processor 22, when accepting the data to be re-displayed from the data processor 21, causes the accepted data to be drawn on the window of the display 40 through the window system 23 (step 222).

Although the above explanation has been as to the case where the data read request is from the view processor 22 in FIGS. 9 and 10, the same holds substantially true when the data read request is from the window system through user input.

Figure 11:
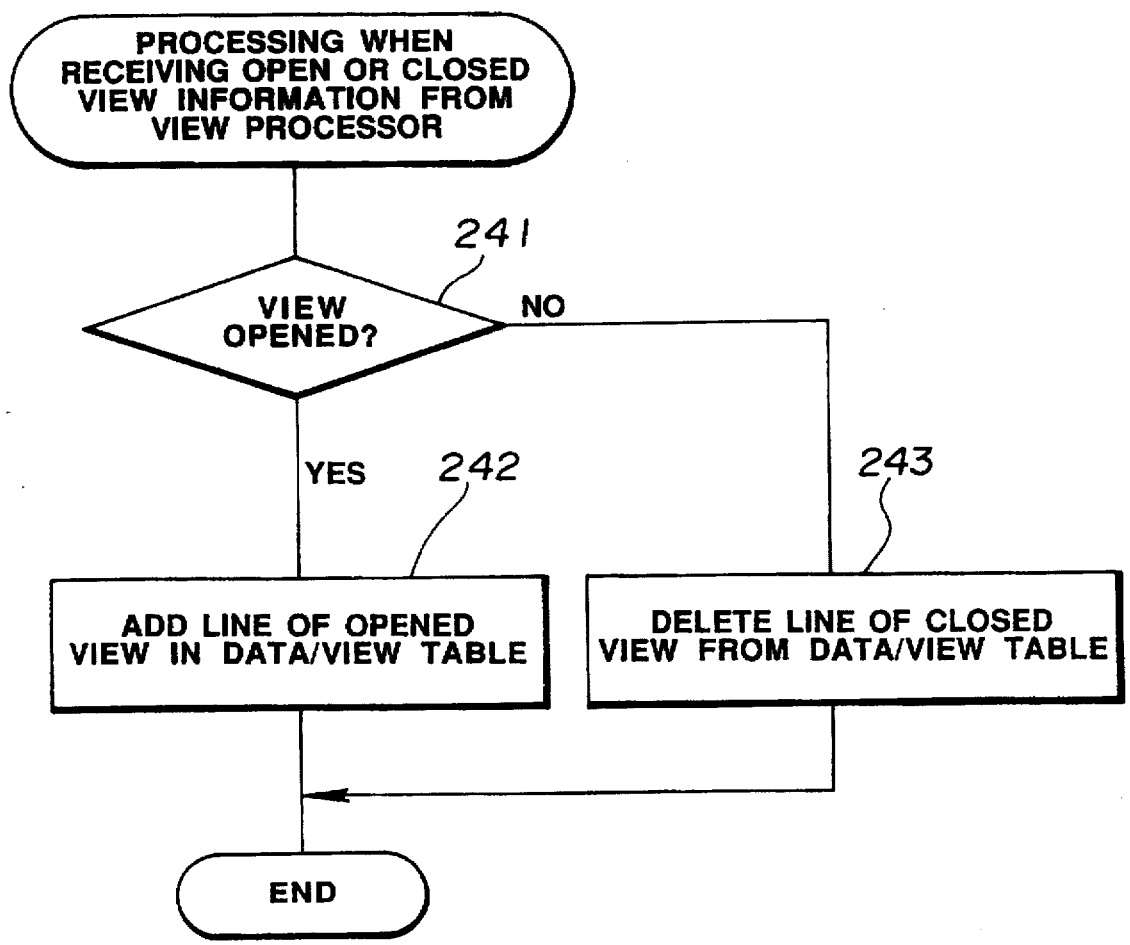
FIG. 11 is a flowchart for explaining the processing operation of the data processor when receiving an opened- or closed-view notification from the window system in response to a user input.

FIG. 11 shows the processing of the data processor 21 when receiving an opened- or closed-view notification from the window system according to a user input. In this case, when a view is opened, this causes addition of a line indicative of a relationship between the opened view and data in such a data/view table as shown in Table 2 (step 242). When the view is closed, this causes deletion of the line indicative of the relationship between the closed view and data from the above table of FIG. 3 (step 243).

What is claimed is:

1. A hypermedia system comprising:
memory means for storing a hypermedia database having been constructed by associating a plurality of data of different types with each other by means of a link;
display means for displaying views of different types; and
control means including a data processing means, a view processing means separate from the data processing means and window control means, for processing the hypermedia database stored in the memory means and for controlling the views displayed on the display means,
wherein the data processing means includes a first data processing section for processing data of a first type, the addition or deletion of said first data processing section being possible without regard to view type, said data processing means identifying, in response to an inquiry from the memory means or the view processing means, the type of data processed and transferring said processed data to a corresponding second data processing section where the data is processed according to data type and
wherein the view processing means includes at least a first view processing section for processing a first type of view, the addition or deletion of said first view being possible without regard to data type, said view processing means identifying, in response to an inquiry from the view processing means or the window control means, the type of view processed and transferring the processed view to a corresponding second view processing section where the view is processed according to view type and
wherein the window control means controls a window of the display means for displaying the view processed by the view processing means, said window control means detecting user input on the window a informing the view processing means of the detected user input.

2. A hypermedia system as set forth in claim 1, wherein the data processing means comprises;
   data transfer means for reading necessary data from the hypermedia database in accordance with a data read request from the view processing means and for transferring the data to the view processing means;
   data change means for changing data in the hypermedia database in accordance with a data change request from the view processing means;
   hold means for holding a relationship between a view to be displayed on the display means and data in the hypermedia database corresponding to the view;
   re-display request information means for informing, when a data in the hypermedia database has been changed by the data change means, the view process means of a re-display request of a view corresponding to the changed data; and
   relation change means for changing the relationship between the view and the data held in the hold means when opening or closing a view to be displayed on the display means, and
   wherein the view processing means comprises:
      view preparation means for preparing a view corresponding to a data transferred by the data transfer means from the data processing means;
      data change request informing means for informing the data processing means of a data change request corresponding to a user input;
      data read request informing means for informing the data processing means of a data read request corresponding to a re-display request when the redisplay request is informed from the data processing means by the redisplay request informing means; and
      view open/close informing means for informing the data processing means of an opening or closing of a view to be displayed on a window of the display means when the opening or closing of the view is controlled by the window control means.

3. A hypermedia system as set forth in claim 1, wherein the data processing means comprises:
   a basic data processing section; and
   a plurality of different type data processing sections for processing data of respective types, an addition or deletion of the different type data processing sections being possible,
      wherein the basic data processing section identifies, in accordance with data processing request from the view processing means or a user, a type of data associated with the data processing request and requests processing of the data by one of the different type data processing sections corresponding to the type of the data and
      wherein the plurality of different type data processing sections process, in accordance with data processing request from the basic data processing section, data associated with the data processing request for each type of data.

4. A hypermedia system as set forth in claim 3, wherein the basic data processing section comprises a table for storing pointers relating to a plurality of different type data processing section in accordance with types of the hypermedia data, and
   wherein, in response to the data processing request, the basic data processing section detects a type of the hypermedia data relating to the data processing request, retrieves the table used on the detected type and calls one of the plurality of different type data processing sections to cause the called data processing section to execute processing of the hypermedia.

5. A hypermedia system as set forth in claim 4, wherein the view processing means comprises:
   a basic view processing section; and
   a plurality of different type view processing sections for processing views of respective types, an addition or deletion of the different type data processing sections being possible,
      wherein the basic view processing section identifies, in accordance with a view processing request from the data processing means or the window control means, a type of view associated with the view processing request and requests processing of the view to one of the different type view processing sections corresponding to the type of the view and
      wherein the plurality of different type view processing sections process, in accordance with a view processing request from the basic view processing section, a view associated with the view processing request for each type of view.

6. A hypermedia system as set forth in claim 5, wherein the basic view processing section comprises another table for storing pointers relating to a plurality of different type view processing section in accordance with types of views and
   wherein, when there is a view processing request, the basic view processing section detects a type of the view relating to the view processing request, retrieves the table based on the detected type and calls one of the plurality of different type view processing sections to cause the called view processing section to execute the view processing.

7. A hypermedia system as set forth in claim 1, wherein the data processing means comprises a table for storing correspondence relationship between each view displayed on each of the windows of the display means and data corresponding to each view,
   wherein the window control means receives an input to the view displayed on each of the windows of the display means, detects the user input, and informs the user thereof,
   wherein the view processing means, when the user is informed of said user input, executes a view processing in accordance with the user input and informs the data processing means of a view processing request corresponding to the view processing,
   wherein the data processing means, when a data processing request is input, executes the processing of data, examines whether there is another view corresponding to the data relating to the dam processing request while referring to the table and, when there is another view, informs the view processing means of a view processing request for said another view,
   wherein the view processing means, executes the processing of said another view, and
   wherein the window control means executes a re-display processing request for the view currently displayed on the display means.

8. A hypermedia system comprising:
   memory means for storing a hypermedia database having been constructed by associating a plurality of data with each other by means of a link;

display means for displaying views; and control means including data processing means, view processing means and window control means, for processing the hypermedia database stored in the memory means and for controlling the views displayed on the display means, said data processing means and said view processing means being separate from one another, wherein the data processing means comprises:

a basic data processing section; and a plurality of data processing sections for processing data of different types, the addition or deletion of a data processing section being possible, wherein the basic data processing section identifies, in accordance with a data processing request from the view processing means of a user, the type of data associated with the data processing request and requests processing of the data to one of the data processing sections corresponding to the type of the data and wherein the plurality of data processing sections process, in accordance with a data processing request from the basic data processing section, the data associated with the data processing request for each type of data, wherein the view processing means comprises:

a basic view processing section; and a plurality of view processing sections for processing views of respective types, the addition or deletion of a data processing section being possible, wherein the basic view processing section identifies, in accordance with a view processing request from the data processing means or the window control means, a type of view associated with the view processing request and requests processing of the view by one of the view processing sections corresponding to the type of the view and wherein the plurality of view processing sections process in accordance with a view processing request and wherein the window control means controls a window of the display means for displaying the view processed by the view processing means, and detects a user input on the window and informs the detected user input to the view processing means.

* * * * *